United States Patent
Hauck et al.

(10) Patent No.: US 6,411,628 B1
(45) Date of Patent: Jun. 25, 2002

(54) DISTRIBUTED ARBITRATION ON A FULL DUPLEX BUS

(75) Inventors: Jerrold V. Hauck, Fremont; David W. LaFollette, Sunnyvale, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/017,451

(22) Filed: Feb. 2, 1998

(51) Int. Cl.$^7$ .................. H04L 12/413; H04L 12/43
(52) U.S. Cl. .................. 370/447; 370/461; 710/240
(58) Field of Search ................ 370/293, 279, 370/445, 446, 447, 449, 450, 451, 454, 455, 461–462, 235–236; 710/220, 240, 241, 242, 244

(56) References Cited

U.S. PATENT DOCUMENTS

| | | | | |
|---|---|---|---|---|
| 4,675,671 A | * | 6/1987 | Ishizuka | 370/455 |
| 4,785,396 A | * | 11/1988 | Murphy | 370/447 |
| 5,167,019 A | | 11/1992 | Fava et al. | |
| 5,245,609 A | * | 9/1993 | Ofek | 370/236 |
| 5,394,556 A | * | 2/1995 | Operscu | 395/800 |
| 5,444,847 A | * | 8/1995 | Iitsuka | 370/461 |
| 5,479,395 A | * | 12/1995 | Goodman | 370/461 |
| 5,495,481 A | * | 2/1996 | Duckwall | 370/447 |
| 5,630,173 A | | 5/1997 | Oprescu | |
| 5,666,488 A | * | 9/1997 | Joh | 370/458 |
| 5,784,648 A | * | 7/1998 | Duckwall | 395/860 |
| 5,802,048 A | * | 9/1998 | Duckwall | 370/447 |
| 5,898,694 A | * | 4/1999 | Ilyadis | 370/461 |

OTHER PUBLICATIONS

*P1394B Arbitration Accleration*; Teener, Michael D. Johas, Firefly, Inc., 1997, Slides 1–9.
*P1394A Enhancements*, Jan. 3, 1997, pp. 1–48.

* cited by examiner

Primary Examiner—Wellington Chin
Assistant Examiner—Steven Nguyen
(74) Attorney, Agent, or Firm—Blakely, Sokoloff, Taylor & Zafman LLP

(57) ABSTRACT

Distributed arbitration in a full-duplex bus system. By distributing the arbitration function among the nodes of a tree topology full-duplex bus system such that arbitration at any particular time is handled by a node holding a grant of the bus at that time (the nominal root node), a reverse flow direction towards the nominal root node is available for arbitration flow. This allows the discrete arbitration phase to be eliminated and generally improves bus efficiency.

17 Claims, 10 Drawing Sheets

DISTRIBUTED ARBITRATION ON A FULL DUPLEX BUS

BACKGROUND OF THE INVENTION

(1) Field of the Invention

The invention relates to data transfer systems. More specifically the invention relates to arbitration on a full duplex bus.

(2) Related Art

For high speed data transfers over a distance, various high speed serial data transfer mechanisms have been developed. The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

In 1394 systems a plurality of nodes are organized into a tree topology. Additionally, all nodes are initially deemed peer to peer but on bus reset, one node assumes root status while the remaining nodes become branches and leaves of the topology. Both 1394-1995 and 1394a are half-duplex protocols. Thus, data may only flow in one direction at any given time. Both of these protocols employ a discrete arbitration phase during which all nodes seeking access to the bus send arbitration requests to the root node. The root node then resolves the arbitration and grants the bus to one of the arbitrating nodes. During this discrete arbitration phase no other useful work can be done on the bus. Desire to eliminate the discrete arbitration phase has spawned various embedded token approaches in which arbitration requests are embedded as tokens within the data packet itself.

The 1394b provides a full-duplex serial bus protocol. This has permitted a combination of embedded token and propagation of requests on the unused signal line to eliminate the discrete arbitration phase. Specifically, when the packet is being sent by a parent node, requests from the children nodes are free to propagate on the unused signal line going back to the parent node. If however, the packet is directed to a parent node the request must be embedded within the data stream. All requests are still handled by the sole root node which remains fixed after system initialization. Accordingly, token embedding will occur on nearly all transactions on at least some bus segments.

Embedding tokens requires that the elasticity buffer of each PHY have extra capacity so as to allow insertion of the extra symbol into the data stream. The larger elasticity buffer increases the latency of repetition through each PHY and therefore increases latency of the overall bus system. Moreover, because arbitration tokens must frequently be embedded in the packet, there is a practical limit to the size and number of tokens that can be used for arbitration.

The embedded token approach presumes that only a single arbitration request can be made during a packet time. Since current protocols favor the first received arbitration request, a tension exists between sending an arbitration request as soon as a desire to arbitrate is known and waiting to see if a higher priority requests arrives from a child node before making the arbitration request. Additionally, once a request has been issued it cannot be withdrawn or modified in any manner until the beginning of another transmitted packet is detected on the bus, at which time any denied node must reissue its arbitration request.

In view of the foregoing it would be desirable to be able to improve the efficiency of arbitration in a full duplex bus system without increasing latency of the system.

BRIEF SUMMARY OF THE INVENTION

A method and apparatus for improving bus efficiency is disclosed. A full-duplex serial bus couples together a plurality of nodes in a tree topology. A node transmitting a current packet is a nominal root node toward which the other node transmits current arbitration information.

DETAILED DESCRIPTION OF THE INVENTION

By distributing the arbitration function among the nodes of a tree topology full-duplex bus system such that arbitration at any particular time is handled by a node holding a grant of the bus at that time (the nominal root node), a reverse flow direction towards the nominal root node is available for arbitration flow. This allows the discrete arbitration phase to be eliminated and generally improves bus efficiency.

Figure 1:
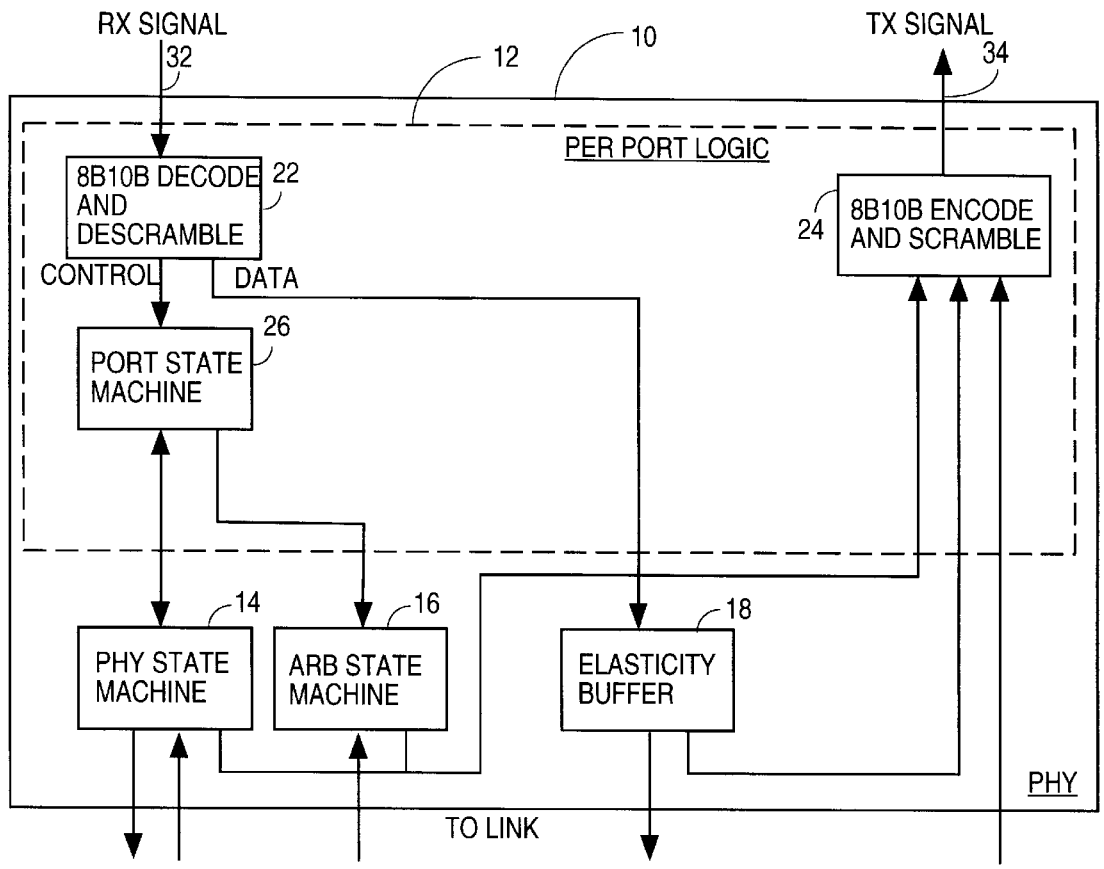
FIG. 1 is a block diagram of a physical layer of one embodiment of the invention.

Now referring to FIG. 1, a physical layer (PHY) 10 has one or more ports which can be connected to a serial bus not shown. For each such port, per port logic 12 is provided as part of the PHY 10. The PHY 10 receives a receive signal 32 and transmits a transmit signal 34 through each active port. Per port logic 12 includes a decoder 22 to decode and descramble the incoming receive signal 32. In one embodiment the decoder 22 is an 8B10B decoder and descrambler, which performs 8-bit 10-bit decoding. This means each 10-bit value coming in as the receive signal 32 is decoded into an 8-bit value. The decoder 22 is coupled to a port state machine 26 which receives a control value decoded by the decoder. Similarly, an encoder 24 is used to encode and scramble the outgoing transmit signal 34. In one embodiment of the invention the encoder performs 8B10B encoding. This is analogous to the decode case, each byte of data to be transmitted is encoded as a 10-bit value. Thus, a number of codings exist that are not used for normal data encoding.

Additionally, the decoder 22 is coupled to an elasticity buffer 18. The elasticity buffer 18 buffers data decoded from the received signal 32 while that data is awaiting transfer to the link and or repetition out on one or more ports of the PHY 10 as the transmit signal 34. The PHY state machine 14 and the arbitration state machine 16 may be combined as a single state machine or may be implemented as two separate state machines. The PHY state machine 14 provides the intelligence for the PHY including generation of any PHY generated packets. The arbitration state machine 16 assesses incoming arbitration information and provides outgoing arbitration requests. If the node is originating a packet on the bus it is the nominal root node. The nominal root node has complete arbitration state information for the topology. Based on this information the arbitration state machine 16 of the nominal root node grants the arbitration request of a highest priority branch. Since nominal root status passes with the grant of the bus, each node should be able to act as arbitrator for the topology.

In one embodiment of the invention, the PHY state machine identifies if a packet to be transmitted is a last packet of a subaction. In the case of a link generated packet it is preferred that the link or some higher layer notify the PHY 10 either through the PHY state machine 14 or possibly the encoder 24 directly, that the packet being sent is the last packet of the subaction. In this way the PHY state machine 14 can cause the encoder 24 to (or the encoder can on its own initiative) insert an end of subaction (EOS) token at the end of a packet to be transmitted. Copending application entitled "Improved Arbitration Techniques For A High Speed Serial Bus", Ser. No. 09/017,425 discloses one method of generating EOS tokens. In one embodiment the EOS token acts as an explicit grant token and is only sent down a highest priority branch. The remaining branches receive the usual data delimiting token, end of data token (EOD). It is also within the scope and contemplation of the invention to use the normal EOD token alone or in combination with an explicit grant token and deny token. Thus, the EOS token is not required but an explicit grant implicitly denotes the end of a subaction. As used herein grant (GNT) token refers to either an explicit grant or an implicit grant e.g. caused by an EOS token. Similarly a deny (DEN) token refers to either explicit deny token or an implicit denial such as by using an EOD token down all branches except one which receives a GNT token.

Figure 2:
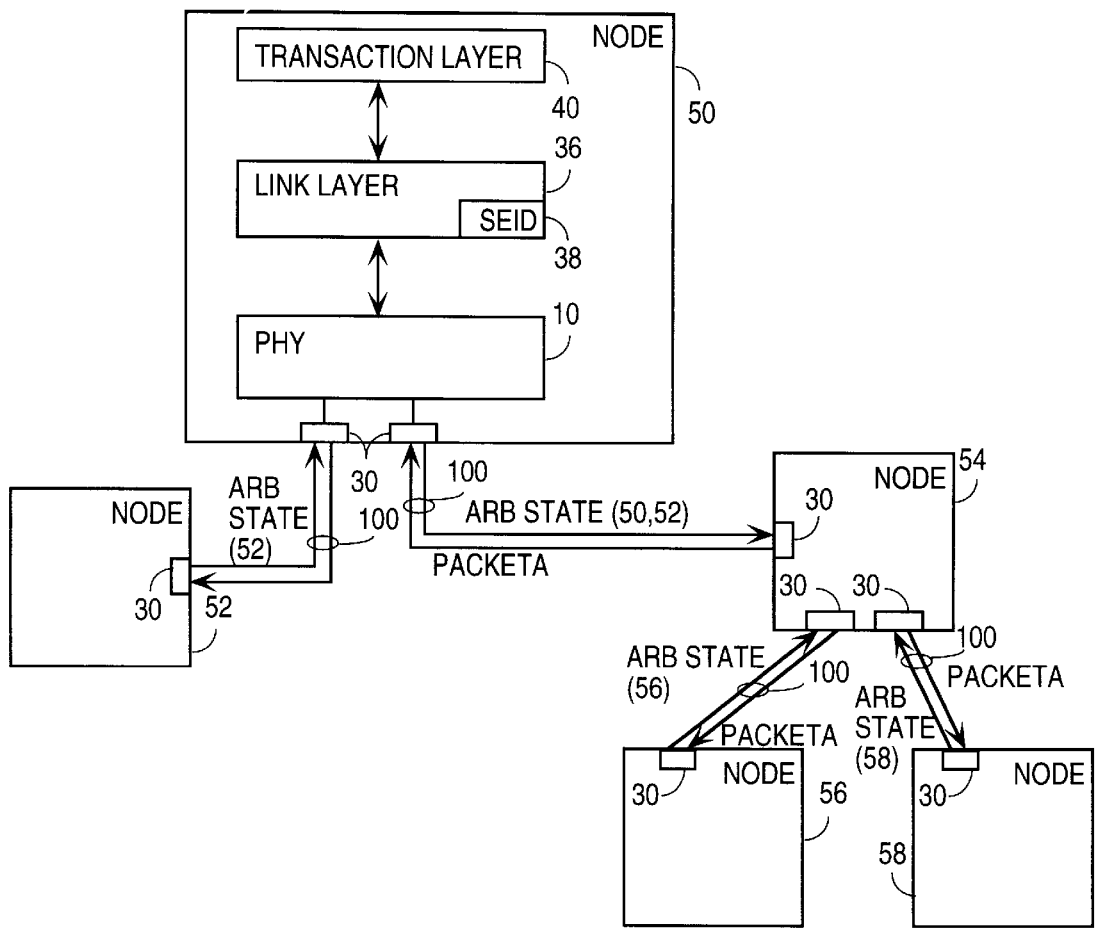
FIG. 2 is a block diagram of a tree topology of one embodiment of the invention during a first unit of time.

FIG. 2 shows a system that includes a plurality of nodes 50–58. The nodes 50–58 are organized in a tree topology. In this topology node 50 is the physical root node. However, employing the invented distributed arbitration technique, which node is the nominal root, nominal branches and nominal leaves depends on which node is permitted to originate a packet on the bus. The nodes are all interconnected by a full duplex serial bus 100. In one embodiment, serial bus 100 follows the 1394b protocol. Each node has one or more ports 30 through which communication between serial bus 100 and PHY 10 is conducted. The PHY 10 communicates with a link layer 36, which in turn communicates with a transaction layer 40. A link layer 36 includes a subaction end identifier (SEID) 38 to identify which link generated packets are last packets of subactions. The SEID 38 may communicate with the PHY state machine or directly with the encoder. As a result, the transmitter knows if the transmitted packet is a last packet of a subaction. This knowledge permits the transmitter to appropriately issue a GNT token.

In FIG. 2, node 54 is transmitting a last packet of a subaction (PACKETA) out all of its ports. Node 54 is therefore the nominal root node and receives arbitration information from each child node such that node 54 has the complete arbitration state of the topology available to it. Because node 54 is a nominal root node and is the only node entitled to transmit a packet on the bus, the opposite directional path towards node 54 from nodes 50, 56 & 58 is available for arbitration state information. Similarly, the path from node 52 to node 50 is also available for arbitration state information thus, node 52 continually forwards the arbitration state information for node 52 to node 50. Node 50 then sends arbitration state information for node 50 and any children nodes in this case its sole child node 52 to node 54. Nodes 56 and 58 send corresponding arbitration state information directly to node 54. It is within the scope and contemplation of the invention that a node not wishing to arbitrate could send no state information or it could send state information reflecting no request at the time. Because node 54 receives the arbitration state information concurrently with packet transmission and node 54 being the nominal root is deemed the arbitrator for the topology, it is able to resolve the arbitration without a discrete arbitration phase.

Now referring to FIG. 3, which shows the tree topology of FIG. 2 at a later instant in time. Node 54 has completed transmission of PACKETA which ends in or is followed by a GNT token granting the bus to a particular branch or the DEN token which is sent down all lower priority branches. In this case, the branch containing node 50 received the GNT token. Once the GNT and DEN tokens are sent node 54 is no longer the nominal root and begins sending arbitration information out each of its ports. Thus, the GNT token is followed immediately by arbitration state information for nodes 54, 56 and 58. The deny token to node 56 is followed by arbitration state information for nodes 50, 52, 54 and 58 while the deny token sent to node 58 is followed by arbitration state information for nodes 50, 52, 54 and 56. In this manner the recipient of the GNT token should, shortly after the grant, receive current state information for the topology. This continues until a packet arrives. Once the NEXT PACKET arrives the packet will be repeated to downstream nodes and the arbitration state information will continue to be sent upstream (in the opposite direction as the packet is moving).

The arbitration state information might be regarded as a logic level on a virtual wire. As such, the node transmitting the arbitration information can change the arbitration state at any time. Thus, if a node's real time priority changes it is free to change its arbitration request even within a subaction. This of course was not possible with prior art and embedded token techniques which mandated only a single request be sent during any particular subaction. Notably, nodes 56 and 58 continue to transmit their state information to node 54 permitting node 54 to constantly update the arbitration state information provided to node 50 along the virtual wire. PACKETA having been repeated by node 50 propagates to node 52. Node 52 continues to send arbitration state information to node 50. Upon receiving the GNT token node 50 may either take the token for itself thereby becoming the nominal root node or it may forward it on to a child having a higher priority arbitration request (here the only possibility is node 52). Presuming that both nodes 50 and 52 have packets to transmit in the fairness interval, bus efficiency is enhanced by node 50 taking the bus first. This is because bus efficiency is negatively impacted by the duration of idle time between two sequential transmitted packets. In turn, idle time is a function of the network distance between the originators of the packets. Consequently, it is desirable to show preference to requesting nodes that are physically closer to the previous packet initiator. Using the invented distributed arbitration technique, the decision point begins with the last packet originator and follows the last packet of the subaction along the highest priority arbitration path. Thus, nodes closer to the originator have the first opportunity to win the bus. Conversely, the root in the prior art embedded token approach usually grants the bus before knowing where the initiator for the last packet in the subaction is located. Thus, large idle times may exist when sequential packet initiators are significant distances apart.

Figure 3:
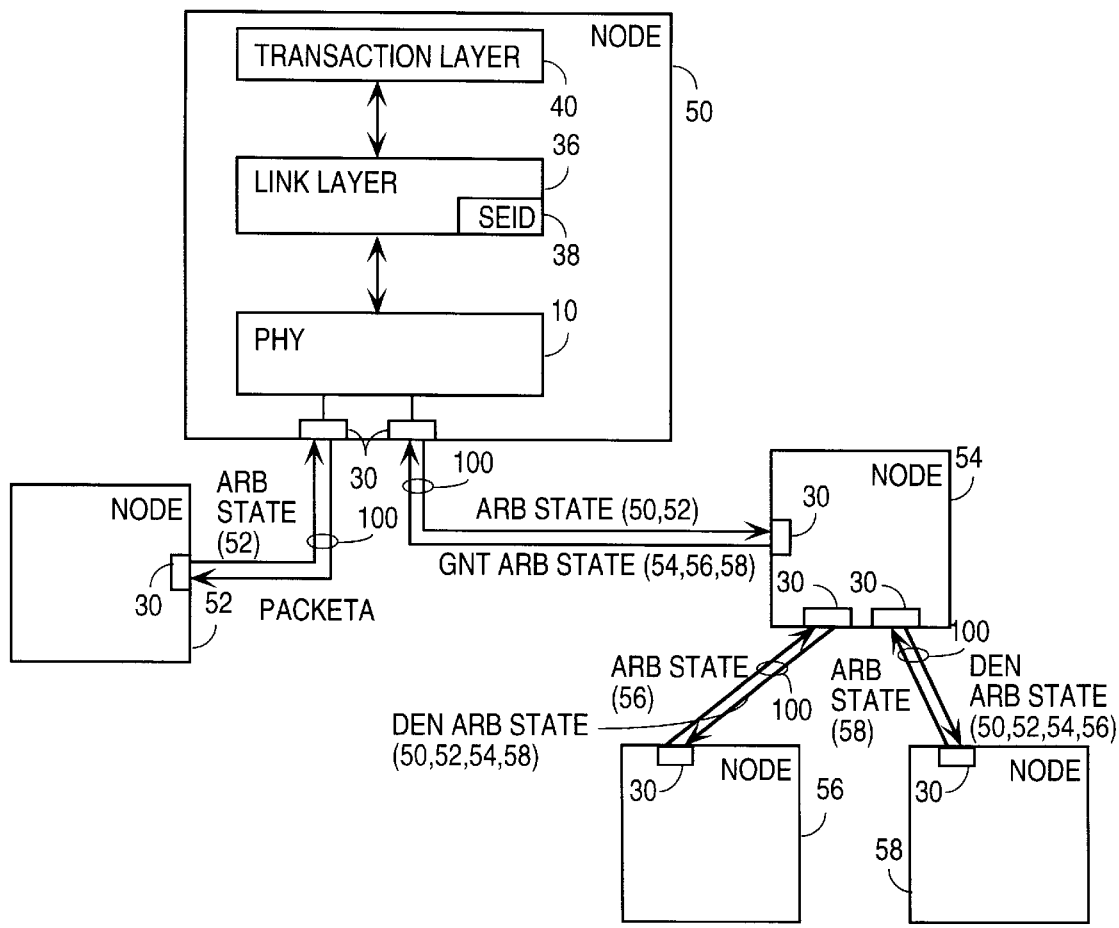
FIG. 3 is a block diagram of the tree topology of FIG. 2 during a second unit of time.
Figure 4:
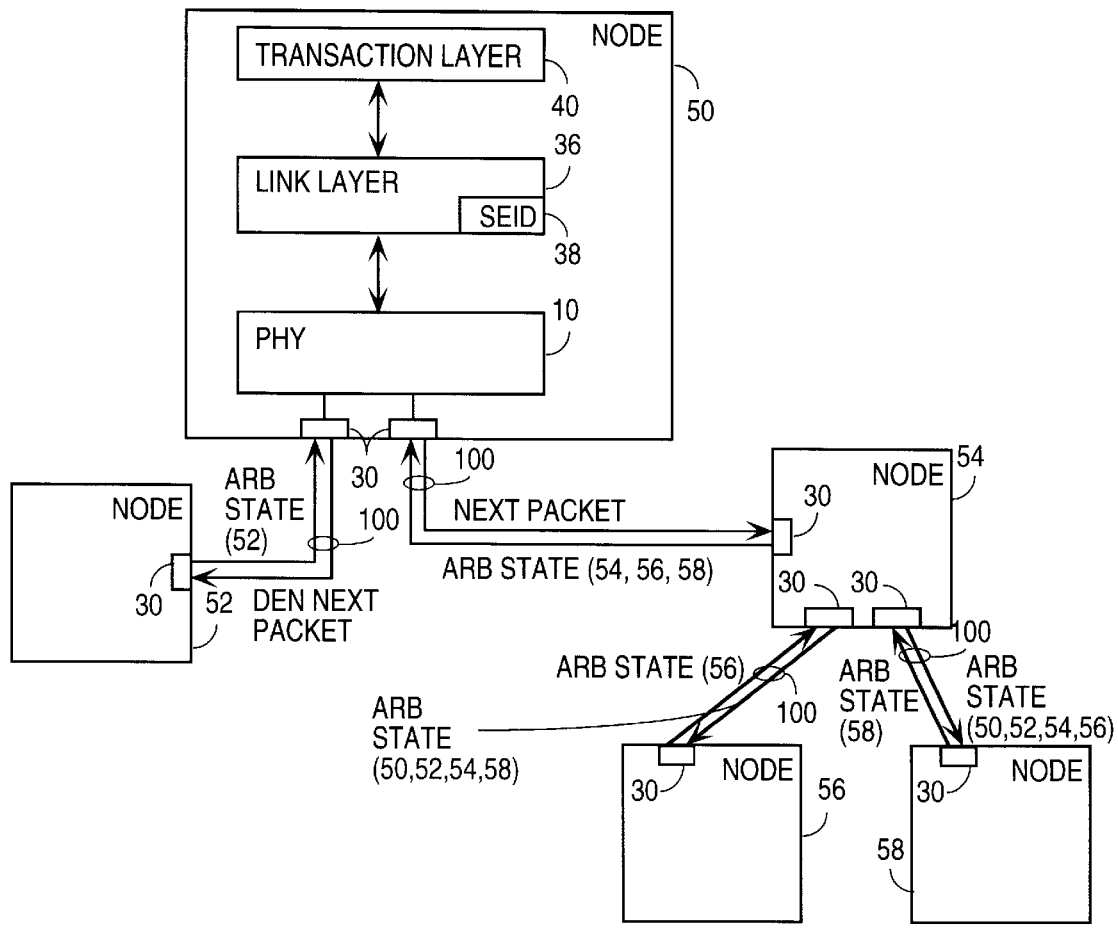
FIG. 4 is a block diagram of the tree topology of FIG. 2 during a third unit of time.
Figure 5:
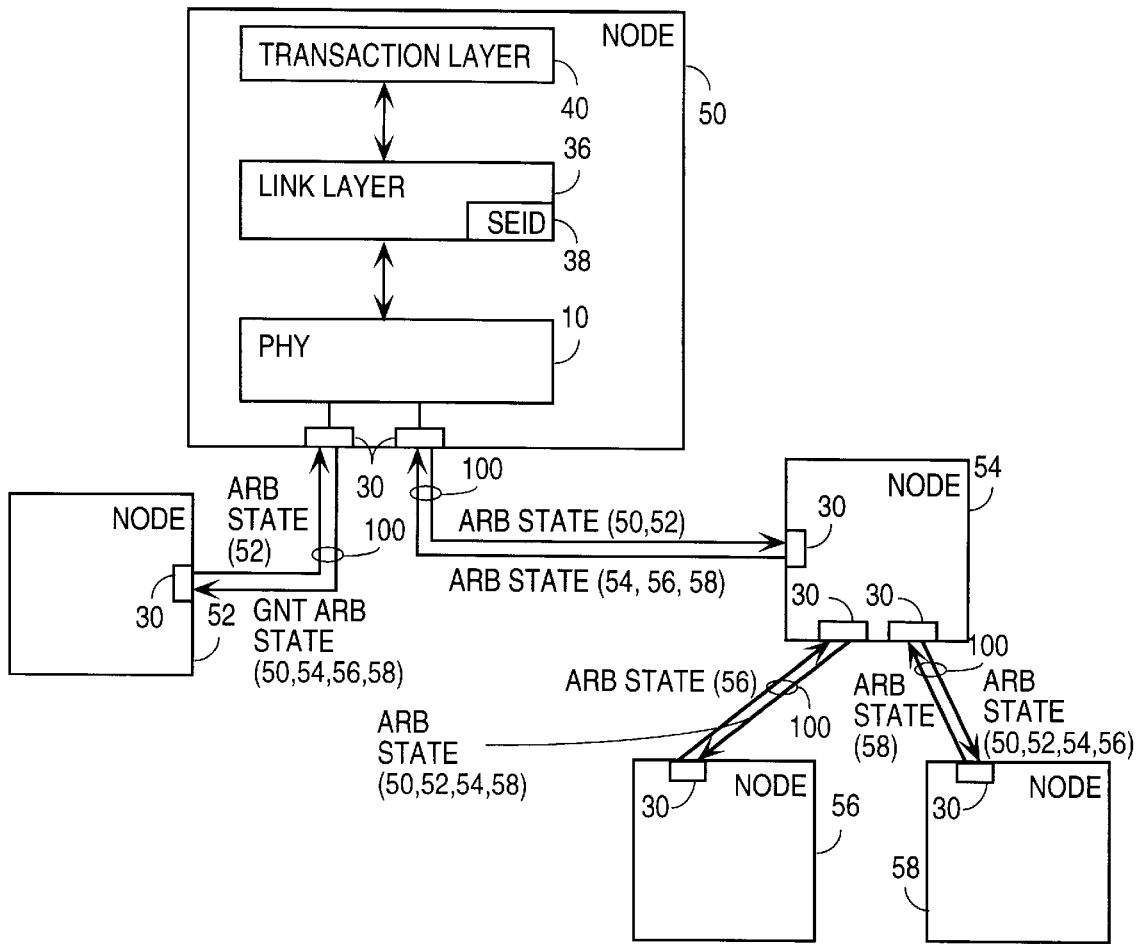
FIG. 5 is a block diagram of the tree topology of FIG. 2 during an alternative third unit of time.

This point can be clarified by referring to FIG. 4 and FIG. 5. In FIG. 4 node 50 claims the GNT while in FIG. 5 node 50 forwards the GNT to node 52. In either case the data flow between nodes 54, 56 and 58 remains the same. Referring to FIG. 4 separately, the NEXT PACKET is transmitted out both ports by node 50 to nodes 54 and 52. With respect to node 52 the NEXT PACKET falls immediately on the heels of the DEN token generated when node 50 accepted the grant token in FIG. 3. Thus, from the perspective of node 52 it sees the continuous stream PACEKTA, DEN token, NEXT PACKET. Thus, the bus is never idle. Conversely, when the grant is forwarded to node 52 as shown in FIG. 5, (assuming each hop through the PHY takes one unit of time), no useful work occurs on the bus during the time unit that the GNT token is forwarded to node 52. Thus, the bus would be idle for one unit of time because the NEXT PACKET transmitted from node 52 to node 50 would not appear on the bus until the time unit following that shown in FIG. 5.

Figure 6:
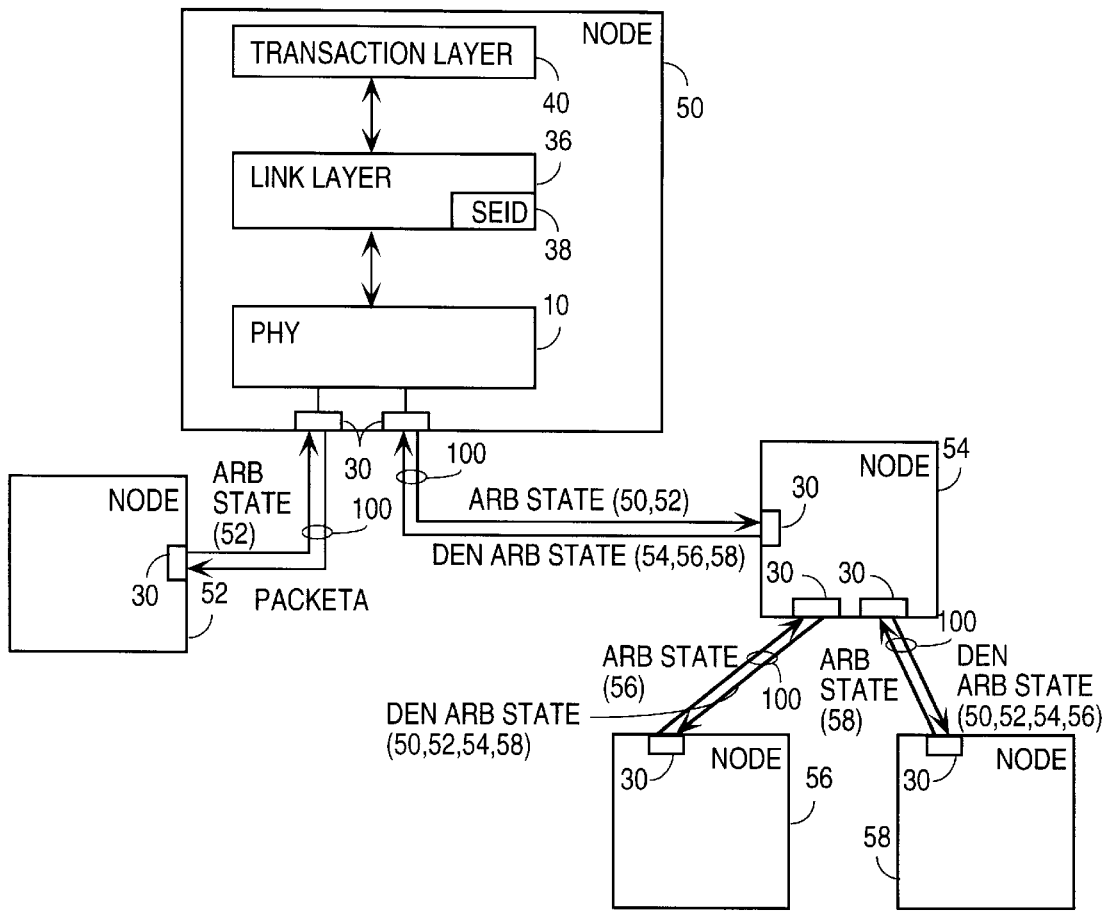
FIG. 6 is a block diagram of the tree topology of FIG. 2 during a alternative second time unit in which the packet sent in the first unit did not end a subaction.

Now, referring to FIG. 6 which presumes that PACKETA (of FIG. 2) requires an acknowledgment (ACK), FIG. 6 is the same as FIG. 3 except that since the PACKETA must be acknowledged, no GNT token is sent. Therefore, node 54 transmits a DEN token along with arbitration state information to node 50.

Figure 7:
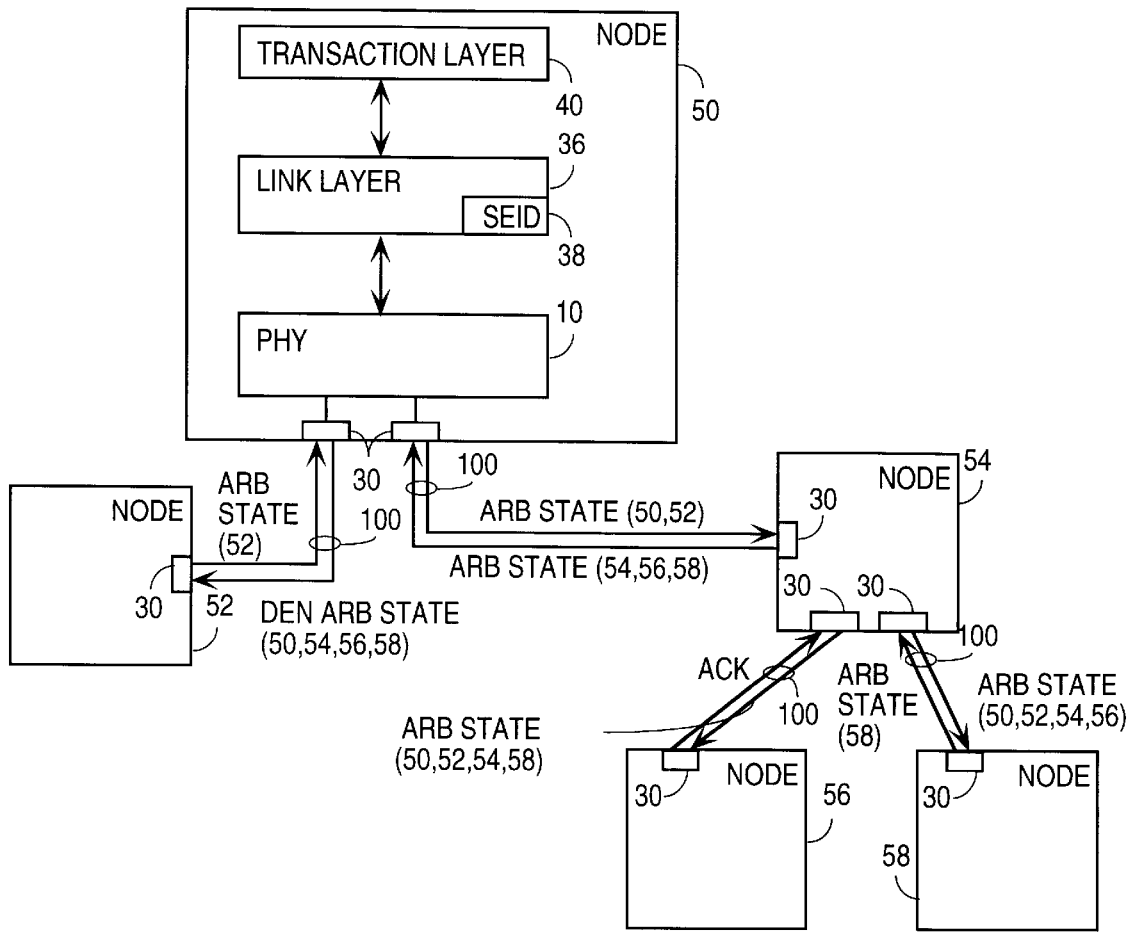
FIG. 7 is a block diagram of the tree topology of FIG. 6 during an alternative third unit of time.

Now referring to FIG. 7, node 56 was the target for PACKETA, which we have presumed required an ACK. Even though it did not receive an explicit grant token, node 56 implicitly becomes the nominal root with the right to transmit an ACK packet. In FIG. 7 the ACK packet is transmitted from node 56 to node 54. Node 50 propagates the DEN token and arbitration state information to node 52. The remaining paths carry arbitration state information between the respective nodes.

Figure 8:
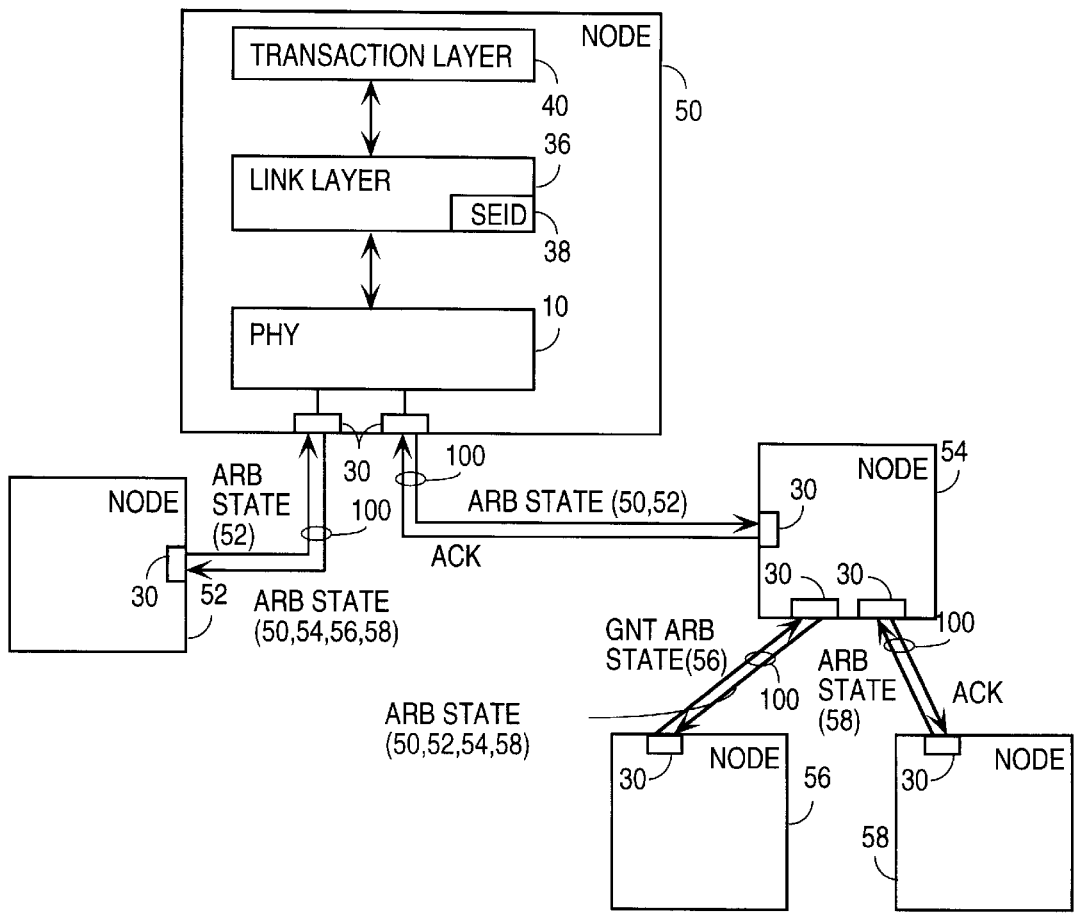
FIG. 8 is a block diagram of the tree topology of FIG. 6 during a fourth unit of time.

Now referring to FIG. 8, node 56 sends a GNT token followed immediately by arbitration state information to node 54. Node 54 repeats the previously received ACK to nodes 50 and 58. Once node 54 receives the grant token it may decide to keep it or pass it along in the manner described above. In a subsequent unit of time the ACK will be propagated to node 52, such that all nodes will have seen the ACK. This presumes that the ACK is transmitted at a rate all nodes can handle. Packet data will not propagate to a node incapable of receiving it.

The distributed arbitration system eliminates the need to embed tokens in the data stream. Because the nominal root shifts from node to node it is guaranteed that the flow path from all other nodes towards the nominal root will be available for arbitration state information. Therefore, unlike the prior art proposed embedded token approach, no increase of the size of elasticity buffers within each node is required. Thus, latency of the system is not increased as would be the case if larger elasticity buffers were used. Moreover, because the arbitration data need not be embedded within packets or added to the elasticity buffer, the size and number of tokens used for arbitration is not as constrained as the prior art case.

The availability of the virtual wire, permits the arbitration state to contain encoded priority information. As time passes, the priority of the underlying arbitration request may increase (such as when it becomes time to send a cycle start packet) or may decrease (in the case the request is withdrawn). The change is propagated to all other nodes by the virtual wire. The embedded token approach does not provide an efficient way to achieve this function since a token cannot be modified once it has been submitted. Similarly, once a grant is given in an embedded token system, it cannot be withdrawn based on a later arriving higher priority request. Moreover, because the embedded token approach uses only a single token it requires heavy error handling support to address lost tokens and other transmission errors. Signaling across the virtual wire is less sensitive to errors because the state information is transitory and will be quickly replaced with refreshed state information. Thus, even if a transmission error occurs the odds of it occurring repetitively are quite small.

Additionally, arbitration reset gaps can be reduced or eliminated. Specifically, if no arbitration requests are pending or received during a packet time the nominal root can initiate a transition to a next fairness interval without waiting for an arbitration reset gap. However, the nominal root should ensure that enough time has elapsed since the last fairness transition was signaled to allow all nodes to submit an updated request. In one embodiment the minimum length of a fairness interval is a worst case propagation delay of the bus plus the arbitration response time.

Figure 9:
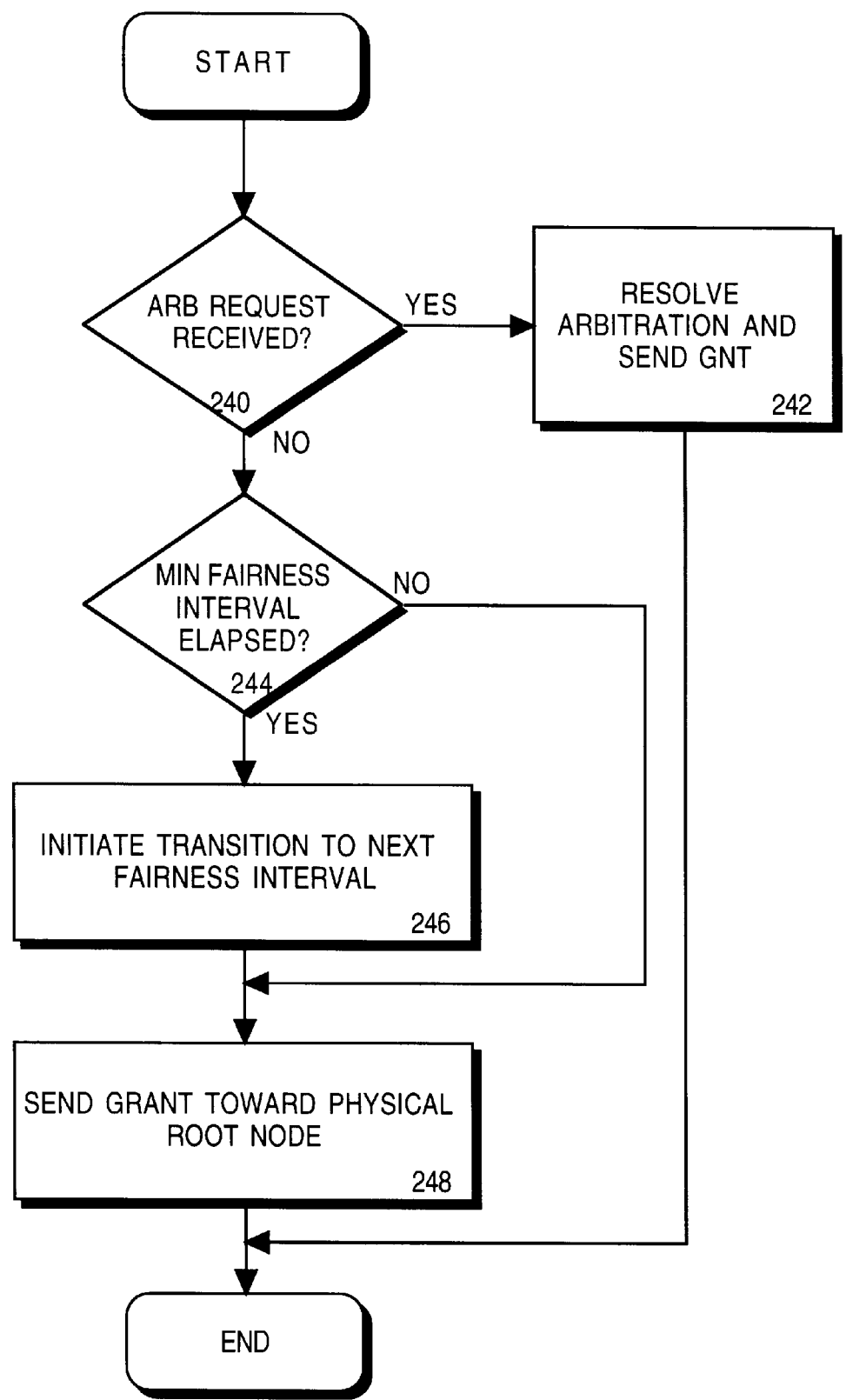
FIG. 9 is a flow chart of arbitration flow in a nominal root node of one embodiment of the invention.

Now referring to FIG. 9, in one embodiment of the invention, the nominal root identifies if an arbitration request has been received at decision block 240. If an arbitration request has been received the nominal root resolves the arbitration request and sends out a grant at functional block 242. If no arbitration request has been received the nominal root determines if a minimum fairness interval has elapsed at decision block 244. If the minimum fairness interval has elapsed the nominal root initiates a transition into a next fairness interval at functional block 246 then, hereinafter initiating the transition or if the minimum fairness interval has not elapsed, a nominal root sends the grant token towards the physical root node at functional block 248, thereby relinquishing nominal root status. If no requests arrive such that an intervening node claims the GNT token it will propagate to the physical root. In another embodiment, the nominal root does not initiate a transition to the next fairness interval but still forwards the GNT token toward the physical root node. Upon receipt of the GNT token with no pending requests the physical root node initiates a transition to the next fairness interval. Both of these embodiments have the advantage that they provide an error recovery mechanism in the event the grant is corrupted during transmission. Specifically, once it transmits the grant the granting node loses nominal root status, but no new nominal root is established.

Figure 10:
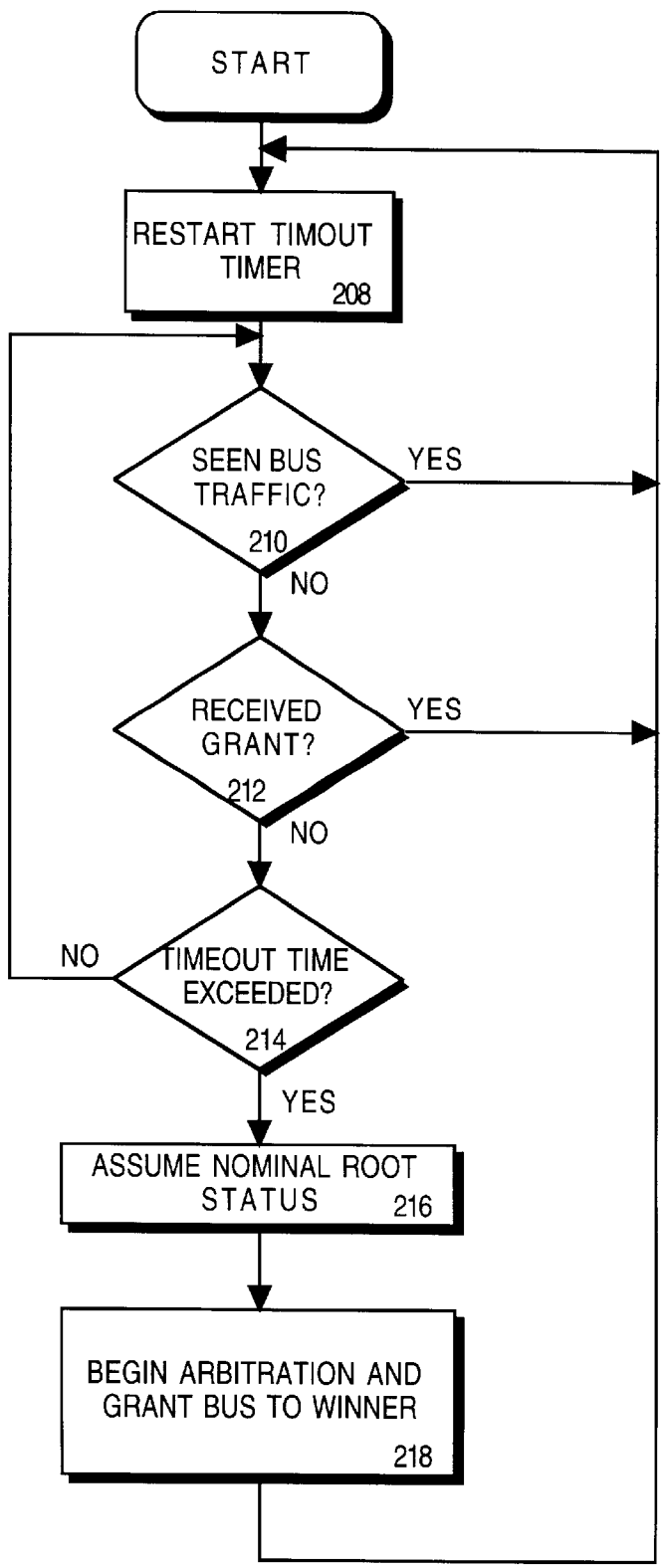
FIG. 10 is a flow chart of error recovery in a physical root node of one embodiment of the invention.

Thus, now referring to FIG. 10 at functional block 208, a time out counter is reset. Then, at decision block 210, the physical root determines if it has seen packet traffic on the bus. If it has, it resets the time out counter and continues to watch for additional bus traffic. If it does not, it checks to see if a GNT has been received at decision block 212. If it has, it resets the counter and continues to watch for bus traffic. If it has not, a decision is made whether a time-out time has been exceeded at decision block 214. If it has not, the physical root continues to watch for bus traffic but does not reset the counter. If it has, the physical root assumes nominal root status at functional block 216, then begins arbitration and grants the bus to the winner at functional block 218. The winner then becomes the nominal root. In this way the bus is prevented from falling into and remaining in an indeterminate state.

In another alternative embodiment the nominal root node initiates a transition into a next fairness interval but does not forward the GNT token toward the nominal root. This embodiment lacks the error recovery mechanism noted above, but is still within the scope and contemplation of the invention.

One of ordinary skill in the art will recognize that the invented distributed arbitration technique is applicable to both asynchronous and isocronous transaction types. Additionally, a node could "remember" the direction the GNT token was sent and only send arbitration information along that branch. The GNT token may also be directed to a specific node rather than just the highest priority branch. Though some of these features may not always optimize performance they are still within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   establishing a node as a nominal root node, the nominal root node being a node with a right to transmit a packet on a bus;
   dynamically changing the nominal root node responsive to a change in right to transmit on the bus;
   preparing, in the nominal root node, a last packet of a subaction to be transmitted over a serial bus;
   transmitting the packet over the serial bus;
   accepting arbitration requests over the serial bus while the packet is prepared and transmitted; and
   processing the arbitration requests in the nominal root node.

2. method of claim 1 further comprising:
   transmitting an arbitration request out all ports following the packet transmission.

3. The method of claim 1 further comprising:
   initiating a transition into a next fairness interval if no arbitration request is received while the packet is prepared and transmitted.

4. The method of claim 2 further comprising:
   repeatedly sending a best real time arbitration request out an upstream port until a grant token is received.

5. The method of claim 1 further comprising:
   attaching a grant (GNT) token to the packet as sent down a highest priority branch; and
   attaching a deny (DEN) token to the packet as sent down all other branches.

6. The method of claim 5 wherein the GNT token is an end of subaction (EOS) token and the deny is an end of data (EOD) token.

7. The method of claim 1 wherein a plurality of nodes are organized into a tree topology and wherein a nominal root node is a node attached to originate a packet on the bus at a particular instant in time.

8. The method of claim 1 further comprising:
   passing the grant toward the nominal root if no arbitration requests are received.

9. An apparatus comprising:
   a first port; and
   a physical layer (PHY) coupled to the first port that encodes a last packet of a subaction for transmission on a serial bus, the PHY arbitrating a next access to the serial bus and attaching a grant token to the last packet of the subaction to be transmitted out a highest priority port the grant token conferring nominal root status on a recipient wherein the PHY comprises an arbitration state machine continually receiving arbitration state information from which the highest priority port is identified.

10. The apparatus of claim 9 wherein the arbitration state machine generates current arbitration state information for the PHY when the PHY is not a PHY entitled to transmit a packet on the bus.

11. The apparatus of claim 9 wherein if no arbitration request for a current fairness interval is received by the arbitration state machine while the packet is prepared and transmitted the PHY initiates a transition into a next fairness interval.

12. A system comprising:
   a full duplex serial bus; and
   a plurality of nodes coupled together in a tree topology by the serial bus wherein a node transmitting a current packet is a nominal root node of the tree topology and wherein each other node repeatedly transmits current arbitration information toward the nominal root node and wherein the nominal root node attaches a grant token to a last packet of a subaction transmitted down a highest priority branch and follows the packet with current arbitration information.

13. The system of claim 12 wherein a node claiming the grant token becomes the nominal root node.

14. The system of claim 12 wherein a branch node receiving a packet with the grant token may acquire nominal root status or forward the grant token to a leaf node which may then acquire nominal root status.

15. The system of claim 12 wherein an arbitrating node closest to the nominal root node is favored to receive the grant token.

16. A system comprising:
   a full duplex serial bus; and
   a plurality of nodes coupled together in a tree topology by the serial bus wherein a node transmitting a current packet is a nominal root node of the tree topology and wherein each other node repeatedly transmits current arbitration information toward the nominal root node and wherein if the nominal root node has received no arbitration requests for a first fairness interval within a time required to prepare and transmit a current packet the nominal root node advances the system to a next fairness interval.

17. A system comprising:
   a full duplex serial bus; and
   a plurality of nodes coupled together in a tree topology by the serial bus wherein a node transmitting a current packet is a nominal root node of the tree topology and wherein each other node repeatedly transmits current arbitration information toward the nominal root node and wherein the nominal root node passes the grant token toward a physical root node if no arbitration requests are received within a time required to prepare and transmit a last packet of a subaction.

* * * * *